United States Patent [19]

Nishioka et al.

[11] Patent Number: 5,173,458
[45] Date of Patent: Dec. 22, 1992

[54] SILICON NITRIDE SINTERED BODY AND PROCESS FOR PRODUCING THE SAME

[75] Inventors: Takao Nishioka; Kenji Matsunuma; Koichi Sogabe; Tomoyuki Awatsu; Masaya Miyake; Takehisa Yamamoto; Akira Yamakawa, all of Itami, Japan

[73] Assignee: Sumitomo Electric Industries, Ltd., Japan

[21] Appl. No.: 810,723

[22] Filed: Dec. 18, 1991

[30] Foreign Application Priority Data

Dec. 28, 1990 [JP] Japan .................. 2-415582
Feb. 25, 1991 [JP] Japan .................. 3-50198

[51] Int. Cl.$^5$ ............................................. C04B 35/58
[52] U.S. Cl. ........................................ 501/97; 501/98; 264/65
[58] Field of Search ........................ 501/97, 98; 264/65

[56] References Cited

U.S. PATENT DOCUMENTS

| | | | |
|---|---|---|---|
| 3,969,125 | 7/1976 | Komeyer et al. | 264/63 X |
| 4,506,020 | 3/1985 | Butler et al. | 501/97 |
| 4,692,419 | 9/1987 | Matsui et al. | 501/97 |
| 4,692,420 | 9/1987 | Oda et al. | 501/97 |
| 4,978,645 | 12/1990 | Ukyo et al. | 501/98 |
| 5,015,608 | 5/1991 | Matsuhisa et al. | 501/97 |
| 5,045,513 | 9/1991 | Mizuno et al. | 501/97 X |

FOREIGN PATENT DOCUMENTS 4921091 5/1974 Japan.

OTHER PUBLICATIONS

Mitomo, "Strengthening of Silicon Nitride Ceramics", Solids Handling Processing Industry, vol. 12, No. 12 pp. 27-32 (1989).

Primary Examiner—Karl Group
Attorney, Agent, or Firm—Jordan B. Bierman

[57] ABSTRACT

Disclosed is a silicon nitride sintered body produced by subjecting a green compact of a mixed powder composed of 1) a silicon nitride powder having a percentage α crystallization of 93% or more and a mean grain diameter of 0.7 μm or less and 2) 5 to 15% by weight in total of a first sintering aid selected from among rare earth element, yttrium oxide and lanthanide oxides and a second sintering aid consisting of aluminum oxide or nitride and at least one selected from among oxides and nitrides of Mg, Ca and Li, to primary sintering in a nitrogen gas atmosphere under a pressure of 1.1 atm or less at 1500° to 1700° C.; and subjecting the sintered body to secondary sintering in a nitrogen gas atmosphere under a pressure of 10 atm or more at the primary sintering temperature or below, thereby giving a sintered body wherein the relative density of the sintered body is 99% or more and the precipitation ratio of an α-$Si_3N_4$ (including β'-sialon) crystal phase ranges from 1:3 to 1:8 in terms of the peak intensity ratio in X-ray diffraction.

6 Claims, No Drawings

SILICON NITRIDE SINTERED BODY AND PROCESS FOR PRODUCING THE SAME

BACKGROUND OF THE INVENTION

1. Field of the Invention

The present invention relates to a silicon nitride sintered body excellent in mechanical strengths particularly at room temperature and also in productivity and cost, and a process for producing the same.

2. Description of the Prior Art

In recent years, in automobile-related fields, various problems including the preservation of the global environment from $CO_2$, $SO_x$, $NO_x$, etc., have brought about a rapid improvement in the fuel consumption, and an attempt has been made on the use of a ceramic material as a valve material for the purpose of reducing the weight and the friction loss. In particular, a silicon nitride material is the most promising material by virtue of its light weight, high strength, high toughness and high Young's modulus. In order for the silicon nitride material to be put to practical use, it should be not only excellent in the mechanical properties such as strength and toughness but also in conformity with commercial needs in respect of the productivity and cost.

Regarding the silicon nitride material, various research and development have hitherto been made mainly on (1) sintering method and (2) sintering aid, etc., for the purpose of improving the strength. For example, as regards the sintering method, the hot press sintering and hot isostatic pressing under a pressure of 1000 atm or more have been employed. These methods provide a sintered body having excellent strength properties but are not always excellent in the productivity and cost. In order to solve such a problem, a proposal has been made on gas pressure sintering (see, for example, Mitomo, Funtai to Kogyo (Solids Handling Processing Industry), vol. 12, No. 12, p. 27 (1989)). In this method, however, the densification of the final sintered body should be conducted at a high sintering temperature because it accompanies the growth of a B-type crystal grain. This is highly liable to bring about the deterioration of the strength due to the precipitation of coarse crystal grains. For this reason, this method has not been regarded as a technique capable of sufficiently satisfying both the requirements of properties and productivity. Regarding the sintering aid, Japanese Patent Publication No. 21091/1974 proposed $Al_2O_3$ and $Y_2O_3$ as sintering aids and these oxides are still now known as typical sintering aids. However, in a sintered body produced through the use of a sintering aid alone, no sufficient densification can be attained without sintering the sintering temperature to 1700 to 1900° C., and in the nitrogen gas pressure sintering near atmospheric pressure, silicon nitride decomposes, so that no stable sintered body can be obtained in some cases. Therefore, the resulting sintered body cannot be regarded as excellent in both the properties and cost.

SUMMARY OF THE INVENTION

An object of the present invention is to provide a silicon nitride sintered body which can simultaneously satisfy both requirements of the productivity and mechanical properties of the sintered body in the prior art. A further object of the present invention is to provide a process for producing such a silicon sintered body.

According to the present invention, there is provided a silicon nitride sintered body produced by sintering a green compact of a mixed powder comprising 1) a silicon nitride source powder having a percentage α crystallization of 93% or more and a mean grain diameter of 0.7 μm or less and 2) a sintering aid composed of a first sintering aid of at least one member selected from the group consisting of rare earth element oxides, Yttrium oxide and lanthanide metal oxides and a second sintering aid consisting of aluminum oxide or nitride and at least one member selected from the group consisting of metal oxides and nitrides of Mg, Ca and Li, the first sintering aid and the second sintering aid including Al oxide or nitride being present in the mixture in an amount of not less than 5% by weight but not more than 15% by weight in terms of the total amount of the first sintering aid and the second sintering aid, in a nitrogen gas atmosphere at 1500° to 1700° C., wherein the precipitation ratio of an $\alpha$-$Si_3N_4$ (including α'-sialon) crystal phase to a $\beta$-$Si_3N_4$ (including β'-sialon) crystal phase [wherein α'-sialon and β'-sialon are solid solution crystal phases, respectively, represented by the formulae $M_x(Si, Al)_{12}(O, N)_{16}$, wherein M is at least one member selected from the group consisting of Li, Mg, Ca, Y and lanthanide metal elements excluding La and Ce and $0 < x \leq 2.0$ and $Si_{6-z}Al_zO_zN_{8-z}$ wherein $0 < z \leq 4.2$] is in the range of from 1:3 to 1:8 in terms of the peak intensity ratio in X-ray diffraction. It has been found that this sintered body has excellent properties, i.e., a high strength of 100 kg/mm² in terms of the four-point bending strength as measured according to JIS R 1601 and a Weibull coefficient of 20 or more. Although the effect of a composite phase comprising the α or α' crystal phase and the β or β' crystal phase on the strength properties of the sintered body has not yet been elucidated, the formation of a composite crystal phase comprising a particulate isometric α or α' crystal and a columnar β or β' crystal contributes to an improvement in the Young's modulus and hardness over those of a sintered body consisting of the conventional β or β' crystal alone. The Young's modulus and hardness serve as a measure of the deformation resistance of the material, and it is thought that in a brittle material, such as a ceramic material, an improvement in these values contribute to an improvement in the strength in a broad sense. Further, according to the Griffith theory which is a fundamental conception of the fracture of the fragile material, the fracture strength, of, is given by the following equation:

$$\sigma f = E \gamma s / 4a$$

wherein E is a Young's modulus, γs is a surface energy of fracture and a is a latent crack length. Since the γs is thought to depend upon the grain boundary phase, an increase in the E value and a reduction in the a value are important to an improvement in the fracture strength. Since the a value depends upon the crystal grain diameter when the dimensional distortion unavoidably occurring in the process is eliminated, the present invention which can improve the filling property by virtue of fine crystal grain is effective in improving the strength in respect of E and γs values. It has been found that the effect of the present invention can be attained when the precipitation ratio of α-$Si_3N_4$ (including α'-sialon) to β-$Si_3N_4$ (including β'-sialon) is in the range of from 1:3 to 1:8.

It has been found that the effect of the present invention becomes more significant when the sintered body satisfies the following requirements besides the above-described constituent features: (1) the silicon nitride source should be one produced by the imide decomposition method, (2) the addition composition ratio of the first sintering aid to the second sintering aid in the sintering aid added should be in the range of 1.5:1 to 5:1 by percent by weight, (3) the mean grain diameters of the α-silicon nitride crystal grain (including α'-sialon) and β-silicon nitride crystal grain (including β'-sialon) should be 0.5 μm or less and 5 μm or less, respectively, and (4) the addition composition ratio of the first sintering aid to the second sintering aid should be in the range of 2:1 to 5:1 by weight and the addition composition ratio of Al oxide or nitride to the other oxides or nitrides of Mg, Ca and Li in the second sintering aid should be in the range of from 2:1 to 5:1.

The silicon nitride sintered body as specified above can be produced by a process comprising:

subjecting a green compact of a mixed powder comprising 1) a silicon nitride source powder having a percentage α crystallization of 93% or more and a mean grain diameter of 0.7 μm or less and 2) a sintering aid composed of a first sintering aid of at least one member selected from the group consisting of rare earth element oxides, yttrium oxide, and lanthanide metal oxides and a second sintering aid consisting of aluminum oxide or nitride and at least one member selected from the group consisting of metal oxides and nitrides of Mg, Ca and Li, the first sintering aid and the second sintering aid including Al oxide or nitride being present in the mixture in an amount of not less than 5% by weight but not more than 15% by weight in terms of the total amount of the first sintering aid and the second sintering aid, to primary sintering in a nitrogen gas atmosphere under a pressure of 1.1 atm or less at 1500° to 1700° C. so that the relative density of the resultant sintered body reaches 93% or more; and subjecting the sintered body to secondary sintering in a nitrogen gas atmosphere under a pressure of 10 atm or more at the primary sintering temperature or below, thereby giving a sintered body wherein the relative density of the sintered body is 99% or more and the precipitation ratio of an α-$Si_3N_4$ (including α'-sialon) crystal phase to a β-$Si_3N_4$ (including β'-sialon) crystal phase is in the range of from 1:3 to 1:8 in terms of the peak intensity ratio in X-ray diffraction.

DETAILED DESCRIPTION OF THE PREFERRED EMBODIMENTS

In order to densify the sintered body in a low-temperature low-pressure nitrogen gas atmosphere, it is necessary to select a combination of a silicon nitride source powder having a percentage α crystallization of 93% or more and a mean grain diameter of 0.7 μm or less and a sintering aid composed of a first sintering aid of at least one oxide selected from among rare earth oxides, yttrium oxide, and lanthanide metal oxides and a second sintering aid of Al oxide or nitride and at least one selected from among metal oxides and nitrides of Mg, Ca and Li, the first sintering aid and the second sintering aid including Al oxide or nitride being present in the mixture in an amount of not less than 5% by weight but not more than 15% by weight in terms of the total amount of the first sintering aid and second sintering aid. In particular, regarding the amount of addition of the sintering aid, when the total amount is less than 5% by weight, the densification of the sintered body does not sufficiently proceed in a low-temperature sintering region. On the other hand, when the total amount exceeds 15% by weight, the amount of the grain boundary phase in the sintered body increases and the sintered body is affected by the process (for example, by the sintering atmosphere), which causes the scattering of the properties. The reason why the silicon nitride source should have a mean grain diameter of 0.7 μm or less and a percentage α crystallization of 93% or more resides in, besides the above-described problem of the sintering, the effect thereof in enhancing the filling property in improving the properties of the sintered body, such as strength, through the formation of such a structure that α-crystal grains remaining in the sintered body are finely filled in the gaps among β grains. Further, detailed studies on the correlation between the filling property and the strength of the sintered body have revealed that a sintered body having a bending strength of 100 kg/mm² or more can be easily produced when the mean grain diameters of the α-silicon nitride crystal grain (including α'-sialon) and the β-silicon nitride crystal grain (including β'-sialon) in the sintered body are 0.5 μm or less and 5 μm or less, respectively. The reason why the addition ratio of the sintering aid should be in the range of from 1.5:1 to 5:1 by percent by weight of the first sintering aid to the second sintering aid is as follows. When the ratio is less than about 1.5:1, the presence of excessive oxygen and Al causes a large amount of the α-sialon crystal phase to be precipitated in part of the sintered body, so that the homogeneity of the crystal phase is deteriorated. On the other hand, when the ratio exceeds 5:1, the sintering in a low temperature region is inhibited. Regarding the addition composition ratio of the Al oxide or nitride to the other oxides or nitride in the second sintering aid, when the ratio is less than about 2:1, the α-sialon crystal phase heterogeneously precipitates in the sintered body, which deteriorates the homogeneity of the crystal phase. On the other hand, when the ratio exceeds 5:1, the sintering in a low-temperature region is inhibited. In the process for producing the above sintered bodies, the primary sintering is conducted under the conditions of 1.1 atm or less and 1500° to 1700° C. for the purpose of providing a sintering process which enables a sintered body to be produced with a high productivity through the use of a continuous sintering furnace, such as a pusher or belt sintering furnace. More specifically, in general, the so-called batch type sintering is mainly used for sintering a silicon nitride material having superior strength properties. In this method, however, the scattering of the temperature distribution within the furnace, lot-to-lot scattering of conditions, etc., inevitably occur, which renders this method unsatisfactory as a method of stably feeding a ceramic material used for automobile parts, etc. On the other hand, since silicon nitride decomposes through sublimation at 1700 to 1800° C. in a nitrogen atmosphere under atmospheric pressure, it is necessary to conduct the sintering in a nitrogen atmosphere under pressure. For this reason, batch type sintering furnace has been used from the viewpoint of usable equipment. In the present invention, since the sintering is conducted at 1700° C. or below, it becomes possible to conduct the sintering under a low pressure of 1.1 atm or less. This leads to another advantage that since the growth of grains during sintering is suppressed, a sintered body having a high filling density and a high strength wherein fine α and β crystal grains are present together can be produced.

The primary sintering is conducted until the relative density of the sintered body reaches 93% or more for the purpose of attaining sufficient densification in the secondary sintering which is conducted in a nitrogen gas atmosphere under a pressure of 10 atm or more at the primary sintering temperature or below. When the secondary sintering is conducted above the primary sintering temperature, the strength properties are deteriorated because the filling density lowers due to the occurrence of the growth of grains and an increase in the proportion of the $\beta$ crystal phase. When the secondary sintering is conducted in a nitrogen atmosphere under a pressure of less than 10 atm, the final sintered body is not sufficiently densified. When the relative density of the resultant sintered body is less than 99%, the scattering of the strength properties unfavorably occurs. In the strength properties of the resultant sintered body, particularly the four-point bending strength according to JIS R 1601 and the Weibull coefficient should be 100 kg/mm$^2$ or more on the average and 20 or more, respectively, because it has been found that when the silicon nitride material is used in exhaust valves for gasoline engines, the above-described properties are necessary from the viewpoint of safety factor wherein the probability of fracture and fatigue strength are taken into consideration. Thus, as is apparent from the foregoing description, the sintered body according to the present invention is excellent in productivity and strength properties.

The present invention will now be described with reference to the following examples.

EXAMPLE 1

A silicon nitride source having a mean grain diameter of 0.4 $\mu$m, a percentage $\alpha$ crystallization of 96% and an oxygen content of 1.5% by weight and powders of Y$_2$O$_3$, Al$_2$O$_3$ and MgO respectively having grain diameters of 0.8 $\mu$m, 0.4 $\mu$m and 0.5 $\mu$m were wet-mixed with each other by means of a nylon ball mill according to the formulations specified in Table 1 in ethanol for 100 hr. The mixture was dried and subjected to CIP molding under a pressure of 3000 kg/mm$^2$ The obtained molding was subjected to primary sintering in a continuous sintering furnace in a nitrogen gas atmosphere under a pressure of 1 atm at 1550° C. for 6 hr and then at 1600° C. for 4 hr. The resultant sintered body was subjected to secondary sintering at 1580° C. in nitrogen gas atmosphere under a pressure of 300 atm for 3 hr. Test pieces having a size of 3 mm × 4 mm × 40 mm conforming to JIS R 1601 were cut out of the sintered body, worked and finished. The four-point bending strength was determined for 15 finished test pieces on each condition. The relative density of the primary sintered body, the relative density of the secondary sintered body, the ratio of the crystal phases, the bending strength and the Weibull coefficient are given in Table 1. The ratio of the crystal phases was determined by X-ray diffraction.

TABLE 1

| No. | Composition (wt. %) Y$_2$O$_3$ | Al$_2$O$_3$ | MgO | Relative density of primary sintered body (%) | Relative density of secondary sintered body (%) | Crystal phase ratio $\alpha,\alpha':\beta,\beta'$ | Bending strength (kg/mm$^2$) Weibull coefficient |
|---|---|---|---|---|---|---|---|
| 1 | 5.0 | 2.0 | 0.5 | 98.0 | 99.8 | 1:4.5 | 134.6 |
| | | | | | | | 21.1 |
| 2 | 5.0 | 2.0 | 1.0 | 97.5 | 99.8 | 1:5.3 | 142.6 |
| | | | | | | | 23.5 |
| 3* | 2.5 | 1.0 | 0.5 | 90.5 | 93.5 | 1:2.6 | 64.3 |
| | | | | | | | 8.2 |
| 4 | 10.0 | 4.0 | 0.5 | 96.2 | 99.5 | 1:7.4 | 105.8 |
| | | | | | | | 18.5 |
| 5* | 12.5 | 5.0 | 1.25 | 96.5 | 98.8 | 1:10.5 | 93.2 |
| | | | | | | | 11.5 |
| 6 | 7.5 | 3.0 | 0.75 | 98.0 | 99.8 | 1:7.3 | 125.6 |
| | | | | | | | 20.8 |
| 7* | 5.0 | 2.0 | — | 92.0 | 95.3 | 1:2.8 | 79.2 |
| | | | | | | | 9.6 |
| 8* | 5.0 | 2.0 | 5.0 | 96.6 | 99.4 | 1:2.2 | 98.2 |
| | | | | | | | 12.6 |
| 9* | 5.0 | 0.5 | 0.2 | 90.6 | 93.8 | 1:2.8 | 70.4 |
| | | | | | | | 9.8 |
| 10 | 5.0 | 1.0 | 0.5 | 97.2 | 99.8 | 1:7.2 | 138.8 |
| | | | | | | | 22.4 |
| 11* | 5.0 | 1.0 | 0.1 | 91.6 | 94.2 | 1:4.3 | 76.3 |
| | | | | | | | 8.7 |
| 12 | 7.5 | 1.5 | 1.0 | 97.2 | 99.6 | 1:5.5 | 140.4 |
| | | | | | | | 22.2 |
| 13* | 7.5 | 5.0 | — | 94.8 | 97.5 | 1:11.0 | 89.5 |
| | | | | | | | 12.4 |

*Comparative Samples

EXAMPLE 2

A commercially available silicon nitride powder produced by the imide decomposition method (percentage $\alpha$ crystallization: 98%, mean grain diameter: 0.5 $\mu$m, oxygen content: 1.38% by weight) was mixed with Y$_2$O$_3$, La$_2$O$_3$ and CeO$_2$ as the first sintering aid and MgO, CaO and Al$_2$O$_3$ as the second sintering aid according to the formulations specified in Table 2 in the same manner as that of the Example 1. The mixtures were dried and molded in the same manner as that of the Example 1, and then sintered under conditions specified in the Table 2. Deflection test pieces conforming to JIS R 1601 were prepared from the sintered bodies in the same manner as that of the Example 1. The properties of the sintered bodies were evaluated in the same manner as that of the Example 1. Specifically, the density of the primary sintered body, the density of the secondary sintered body, the ratio of the crystal phases and the mean grain diameters of α, α' and β' crystal grains were evaluated on 30 to 50 samples for 5 visual fields. Further, the bending strength and Weibull coefficient were also evaluated. The results are given in Table 3.

TABLE 2

| No. | First sintering aid | | | Second sintering aid | | | Primary sintering condition (1 atm $N_2$) | Secondary sintering condition |
|---|---|---|---|---|---|---|---|---|
| | $Y_2O_3$ | $La_2O_3$ | $CeO_2$ | MgO | CaO | $Al_2O_3$ | | |
| 1 | 3.0 | 2.0 | — | 1.0 | — | 2.0 | 1550° C. × 6H/ 1600° C. × 4H/ | 1580° C. × 3H 300 atm $N_2$ |
| 2 | — | 5.0 | — | 1.0 | — | 2.0 | 1550° C. × 6H/ 1600° C. × 4H/ | 1580° C. × 3H 300 atm $N_2$ |
| 3 | — | 3.0 | 2.0 | 1.0 | — | 2.0 | 1550° C. × 6H/ 1600° C. × 4H/ | 1580° C. × 3H 300 atm $N_2$ |
| 4 | — | — | 5.0 | 1.0 | — | 2.0 | 1550° C. × 6H/ 1600° C. × 4H/ | 1580° C. × 3H 300 atm $N_2$ |
| 5 | 3.0 | — | 2.0 | 1.0 | — | 2.0 | 1550° C. × 6H/ 1600° C. × 4H/ | 1580° C. × 3H 300 atm $N_2$ |
| 6 | 3.0 | 2.0 | — | — | 1.0 | 2.0 | 1550° C. × 6H/ 1600° C. × 4H/ | 1580° C. × 3H 300 atm $N_2$ |
| 7 | 3.0 | 2.0 | — | 0.5 | — | 2.0 | 1550° C. × 6H/ 1600° C. × 4H/ | 1580° C. × 3H 300 atm $N_2$ |
| 8 | 3.0 | 2.0 | — | — | 0.5 | 2.0 | 1550° C. × 6H/ 1600° C. × 4H/ | 1580° C. × 3H 300 atm $N_2$ |
| 9* | 3.0 | 2.0 | — | — | 1.0 | 2.0 | 1700° C. × 3H/ 1850° C. × 4H/ × 4 atm $N_2$ | 1580° C. × 3H 300 atm $N_2$ |
| 10* | 5.0 | — | — | — | 1.0 | 2.0 | 1700° C. × 3H/ 1850° C. × 4H/ × 4 atm $N_2$ | 1580° C. × 3H 300 atm $N_2$ |
| 11 | 5.0 | — | — | 0.5 | 0.5 | 2.0 | 1550° C. × 6H/ 1600° C. × 4H | 1580° C. × 3H 300 atm $N_2$ |
| 12 | 3.0 | 2.0 | 2.0 | 1.0 | — | | 1550° C. × 6H/ 1600° C. × 4H | 1580° C. × 3H 300 atm $N_2$ |
| 13 | 3.0 | 2.0 | — | 1.0 | — | | 1550° C. × 6H/ 1700° C. × 4H | 1580° C. × 3H 300 atm $N_2$ |
| 14 | 3.0 | 2.0 | — | 1.0 | — | | 1550° C. × 6H/ 1600° C. × 4H | 1580° C. × 1H 1000 atm $N_2$ |
| 15 | 3.0 | 2.0 | — | 1.0 | — | | 1550° C. × 6H/ 1600° C. × 4H | 1580° C. × 1H 2000 atm $N_2$ |
| 16 | 3.0 | 2.0 | — | 1.0 | — | | 1550° C. × 6H/ 1600° C. × 4H | 1580° C. × 3H 80 atm $N_2$ |
| 17 | 3.0 | 2.0 | — | 0.5 | — | | 1550° C. × 6H/ 1600° C. × 4H | 1580° C. × 3H 80 atm $N_2$ |

*Comparative Samples

TABLE 3

| No. | Relative density of primary sintered body (%) | Relative density of secondary sintered body (%) | Crystal phase ratio α,α':β,β' | Mean crystal grain diameter (μm) α,α':β,β' | Bending strength (kg/mm²) | Weibull coefficient |
|---|---|---|---|---|---|---|
| 1 | 97.0 | 99.7 | 1:5.5 | 0.2 / 2.4 | 138.8 | 22.6 |
| 2 | 96.2 | 99.3 | 1:6.9 | 0.2 / 2.5 | 126.5 | 20.8 |
| 3 | 96.4 | 99.5 | 1:6.5 | 0.2 / 2.3 | 124.9 | 20.4 |
| 4 | 95.6 | 98.8 | 1:4.2 | 0.2 / 2.7 | 122.2 | 20.9 |
| 5 | 96.5 | 99.3 | 1:5.0 | 0.2 / 2.9 | 120.5 | 20.4 |
| 6 | 97.0 | 99.5 | 1:6.0 | 0.2 / 2.5 | 134.6 | 21.8 |
| 7 | 97.2 | 99.8 | 1:5.4 | 0.2 / 2.4 | 137.4 | 22.8 |
| 8 | 96.8 | 99.5 | 1:5.8 | 0.2 / 2.5 | 134.3 | 21.9 |
| 9* | 96.2 | 99.0 | no α phase | — / 5.8 | 95.4 | 14.8 |
| 10* | 96.5 | 99.2 | no α phase | — / 7.2 | 92.8 | 12.4 |
| 11 | 96.6 | 99.5 | 1:5.5 | 0.2 / 3.8 | 130.8 | 19.6 |
| 12 | 95.5 | 99.2 | 1:6.5 | 0.2 / 3.9 | 122.6 | 19.5 |
| 13 | 97.8 | 99.4 | 1:3.5 | 0.4 / 4.5 | 127.3 | 20.3 |
| 14 | 97.0 | 99.5 | 1:5.5 | 0.2 | 136.8 | 20.9 |

TABLE 3-continued

| No. | Relative density of primary sintered body (%) | Relative density of secondary sintered body (%) | Crystal phase ratio $\alpha,\alpha':\beta,\beta'$ | Mean crystal grain diameter (μm) $\alpha,\alpha':\beta,\beta'$ | Bending strength (kg/mm$^2$) | Weibull coefficient |
|---|---|---|---|---|---|---|
| 15 | 97.0 | 99.6 | 1:5.5 | 0.2 / 2.5 | 135.4 | 21.0 |
| 16 | 97.0 | 99.6 | 1:5.5 | 0.2 / 2.4 | 136.6 | 20.0 |
| 17 | 97.2 | 99.7 | 1:5.4 | 0.2 / 2.5 | 135.8 | 21.4 |

*Comparative Samples

As is apparent from the above-described detailed description, according to the present invention, a silicon nitride sintered body can be produced with a high productivity in a high yield at a low cost through primary sintering at a low temperature under atmospheric pressure, and when the sintering is completed at a low temperature, it is possible to produce a sintered body having excellent mechanical properties, since a sintered body having a high filling property wherein a fine α crystal stable at a low temperature coexists can be easily produced. The sintered body of the present invention can be used particularly for applications where the cost, strength and reliability are requires, such as automobile parts.

What is claimed is:

1. A silicon nitride sintered body produced by sintering a green compact of a mixed powder comprising 1) a silicon nitride source powder having a percentage α crystallization of 93% or more and a mean grain diameter of 0.7 μm or less and 2) a combined sintering aid composed of a first sintering aid which is yttrium oxide, and a second sintering aid consisting of aluminum oxide or nitride and at least one member selected from the group consisting of metal oxides and nitrides of Mg, Ca and Li, the total of said first sintering aid and said second sintering aid being not less than 5% by weight but not more than 15% by weight based on the total of said powder and said combined sintering aid, said sintering taking place in a nitrogen gas atmosphere at 1500° to 1700° C., wherein the precipitation ratio of an $\alpha$-Si$_3$N$_4$, including $\alpha'$-sialon, crystal phase to a $\beta$-Si$_3$N$_4$, including $\beta'$-sialon, crystal phase is from 1:3 to 1:8 in terms of the peak intensity ratio in X-ray diffraction, the weight ratio of said first sintering aid to said second sintering aid being 1.5:1 to 5:1 and the weight ratio of said aluminum oxide or nitride to said metal oxides and nitrides is 2:1 to 5:1.

2. A silicon nitride sintered body according to claim 1, which has a four-point bending strength of 100 kg/mm$^2$ or more as determined according to JIS R 1601 and a Weibull coefficient of 20 or more.

3. A silicon nitride sintered body according to claim 1, wherein the silicon nitride source is one produced by the imide decomposition method.

4. A silicon nitride sintered body according to claim 1, wherein the ratio of the first sintering aid to the second sintering aid is in the range of 1.5:1 to 5:1 in terms of percent by weight.

5. A silicon nitride sintered body according to claim 1, wherein in the sintered body, the mean grain diameter of the $\alpha$-Si$_3$N$_4$ including $\alpha'$-sialon, crystal grain is 0.5 μm or less and the mean grain diameter of the $\beta$-Si$_3$N$_4$ (including $\beta'$-sialon) crystal grain is 5 μm or less.

6. A process for producing a silicon nitride sintered body, comprising:
 subjecting a green compact of a mixed powder comprising 1) a silicon nitride source powder having a percentage α crystallization of 93% or more and a mean grain diameter of 0.7 μm or less and 2) a combined sintering aid composed of a first sintering aid which is yttrium oxide and a second sintering aid consisting of aluminum oxide or nitride and at least one member selected from the group consisting of metal oxides and nitrides of Mg, Ca and Li, the total of said first sintering aid and said second sintering aid being not less than 5% by weight but not more than 15% by weight based on the total of said powder and said combined sintering aid to primary sintering in a nitrogen gas atmosphere under a pressure of 1.1 atmosphere or less at a primary sintering temperature of 1500° to 1700° C. so that the relative density of said sintered body is at least 93%; and
 subjecting said sintered body to secondary sintering in a nitrogen gas atmosphere under a pressure of at least 10 atmosphere at said primary sintering temperature or below, whereby said sintered body was a relative density of at least 99% and the precipitation ratio of an $\alpha$-Si$_3$N$_4$, including $\alpha'$-sialon, crystal phase to a $\beta$-Si$_3$N$_4$, including $\beta'$-sialon, crystal phase is from 1:3 to 1:8 in terms of the peak intensity ratio in X-ray diffraction.

* * * * *